United States Patent
Wike, Jr.

[11] Patent Number: 5,149,949
[45] Date of Patent: Sep. 22, 1992

[54] OPTICAL SCANNER WITH COUNTERROTATING REFLECTOR ELEMENTS

[75] Inventor: Charles K. Wike, Jr., Cambridge, Ohio

[73] Assignee: NCR Corporation, Dayton, Ohio

[21] Appl. No.: 625,323

[22] Filed: Dec. 10, 1990

[51] Int. Cl.⁵ .................................. G06K 7/10
[52] U.S. Cl. ...................... 235/467; 235/470
[58] Field of Search ........... 235/472, 462, 467, 470; 350/6.7, 6.8, 6.9, 6.91; 250/236; 359/201, 203, 212, 216, 217–219

[56] References Cited

U.S. PATENT DOCUMENTS

| | | | |
|---|---|---|---|
| 2,997,539 | 8/1961 | Blackstone | 250/233 |
| 3,632,871 | 1/1972 | Watkins et al. | 358/206 |
| 3,978,317 | 8/1976 | Yamaguchi et al. | 235/467 |
| 4,030,807 | 6/1977 | Briney | 359/220 |
| 4,037,920 | 7/1977 | Runciman et al. | 250/236 |
| 4,039,246 | 8/1977 | Voigt | 359/220 |
| 4,057,784 | 11/1977 | Tafoya | 235/467 |
| 4,076,372 | 2/1978 | Pole et al. | 359/220 |
| 4,699,447 | 10/1987 | Howard | 359/220 |
| 4,794,237 | 12/1988 | Ferrante | 235/462 |
| 4,795,224 | 1/1989 | Goto | 359/220 |
| 4,935,609 | 6/1990 | Wike, Jr. | 235/467 |
| 4,939,356 | 7/1990 | Rando et al. | 235/467 |
| 4,971,410 | 11/1990 | Wike, Jr. et al. | 235/472 |

FOREIGN PATENT DOCUMENTS

| | | | |
|---|---|---|---|
| 53-26140 | 3/1978 | Japan | 235/467 |
| 53-133329 | 11/1978 | Japan | 235/470 |

Primary Examiner—Robert Weinhardt
Attorney, Agent, or Firm—Richard W. Lavin

[57] ABSTRACT

A compact optical scanning apparatus includes a motor driven hollow drive shaft through which scanning light beams are projected. A mirror mounted on one end of the drive member deflects the light beams to the side of the drive member, said light beams impinge on the interior surfaces of a conically shaped ring of mirrors. The ring of mirrors will deflect the light beams downwardly towards a circular mirror mounted horizontally which reflects the light beams towards a ring of pattern forming mirrors mounted perpendicular to the circular mirror. The pattern forming mirrors will reflect the light beams through an aperture in the scanning apparatus in the form of a scanning pattern. A gear mechanism mounted between the ring of mirrors and the drive shaft rotates the ring of mirrors in a direction opposite to that of the drive shaft.

21 Claims, 7 Drawing Sheets

OPTICAL SCANNER WITH COUNTERROTATING REFLECTOR ELEMENTS

BACKGROUND OF THE INVENTION

The present invention relates to optical scanning systems and more particularly to an optical bar code scanning system which can be mounted within a checkout counter or other type of support member for scanning bar code labels on a merchandise item which is moved past a scanning aperture located in the bar code scanner.

In present-day merchandising point-of-sale operations, data pertaining to the purchase of a merchandise item is obtained by reading data encoded indicia such as a bar code printed on the merchandise item. In order to standardize the bar codes used in various point-of-sale checkout systems, the grocery industry has adapted a uniform product code (UPC) which is in the form of a bar code. Various reading systems have been constructed to read this type of bar code, including handheld scanners which are moved across the bar code and stationary optical reader systems normally located within the checkout counter in which the bar code is read by projecting a plurality of scanning light beams through a window constituting the scanning area of the counter over which a bar code printed on a purchased merchandise item or on a bar code label attached to the merchandise item is moved. This scanning operation is part of the process of loading the item into a baggage cart. In scanning the bar code label, a scan pattern is generated by the scanning apparatus which consists of a plurality of individual scanning lines oriented in various directions so as to enable the scan pattern to scan the bar code label irrespective of its orientation with respect to the scan pattern. The most common prior art scan pattern is in the form of an X together with an horizontal line. To generate a scan pattern containing more scan lines would require a more complex mirror arrangement within the scanning apparatus which increases the cost of the scanning apparatus. Scanning systems presently found in checkout counters comprise a large structure mounted within the counter having a number of mirrors mounted so as to occupy the internal area of the checkout counter. It would be desirable to have a compact optical scanner which would be not only low in cost but which would be able to produce a scanning pattern composed of a dense pattern of scan lines and which would not occupy a large portion of the checkout counter.

SUMMARY OF THE INVENTION

There is provided, in accordance with the present invention, an optical scanning unit which may be mounted adjacent the top surface of a checkout counter or any other type of support member which includes a laser source for projecting laser light beams through the hollow drive shaft of a motor which is mounted for support on a printed circuit board. Supported by the motor is a ring shape base support member on which is mounted by means of a plurality of bearing members a ring support member which includes a plurality of arm members for supporting a conical shaped ring of deflecting mirrors enclosing the motor and the drive shaft. Mounted on the end of the hollow drive shaft is a deflecting member for deflecting the laser light beam outwardly to the ring of mirrors which in turn deflect the laser light beams in a downward direction to a circular ring member. The circular ring member deflects the laser light beams at a ring of vertically oriented pattern forming mirror members which deflect the received light beams through an aperture in the top of the checkout counter in a scanning direction for scanning a bar code label positioned adjacent the aperture. A gear member secured to the drive shaft engages a drive gear supported on the base member which engages the internal teeth of the ring support member for rotating the ring support member together with the ring of mirrors in a direction opposite to the direction of rotation of the drive shaft and the deflecting member. This arrangement will generate a scan pattern comprising a large number of rectilinear lines producing a highly dense scan pattern which is rotated in a circular direction enabling the scan pattern to scan a bar code label irrespective of its orientation.

It is therefore a principal object of this invention to provide an optical scanning apparatus which generates a highly dense scan pattern comprising a plurality of straight scan lines oriented in a direction perpendicular to each other.

It is another object of this invention to provide an optical scanner which is compact in structure enabling the scanner to be installed in a very small supporting member.

It is a further object of this invention to provide a compact optical scanning apparatus which is simple in construction and therefore low in cost.

BRIEF DESCRIPTION OF THE DRAWINGS

These and other objects, features and advantages of the invention, as well as the invention itself, will become more apparent to those skilled in the art in light of the following detailed description taken into consideration with the accompanying drawings wherein like reference numerals indicate like or corresponding parts throughout the several views and wherein.

DESCRIPTION OF THE PREFERRED EMBODIMENT

Figure 1:
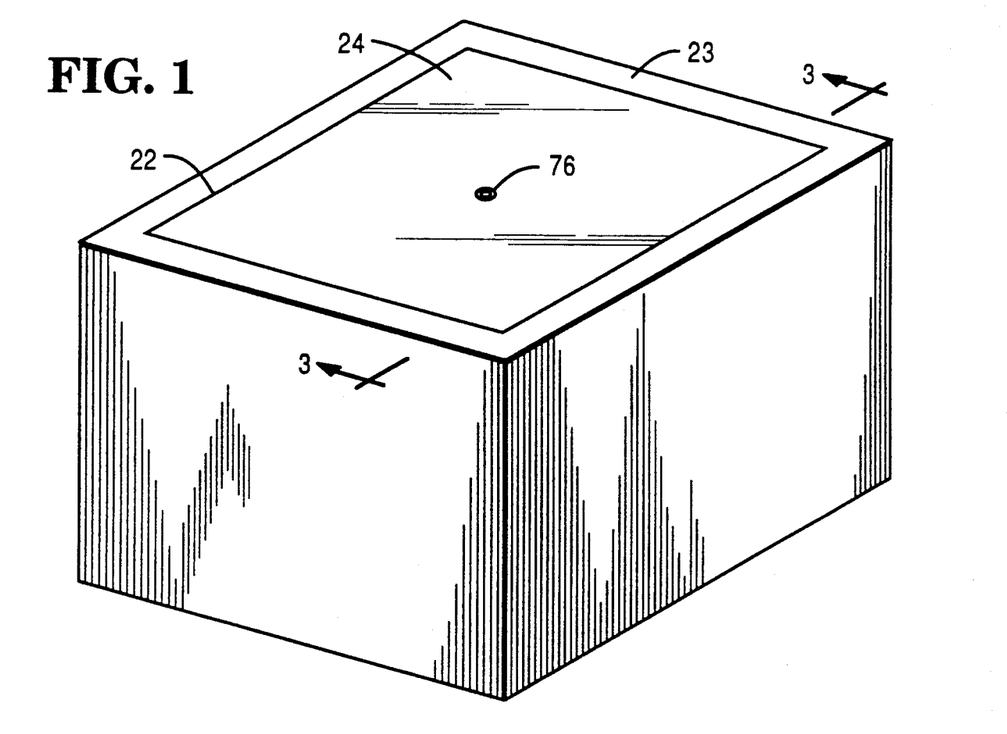
FIG. 1 is a perspective view of a housing member within which the optical scanning apparatus of the present invention is mounted which includes an aperture through which scanning light beams are projected for scanning a bar code label positioned adjacent the aperture.

Referring now to FIG. 1, there is shown a perspective view of a housing member 20 in which is located the optical scanning apparatus of the present invention.

Figure 7:
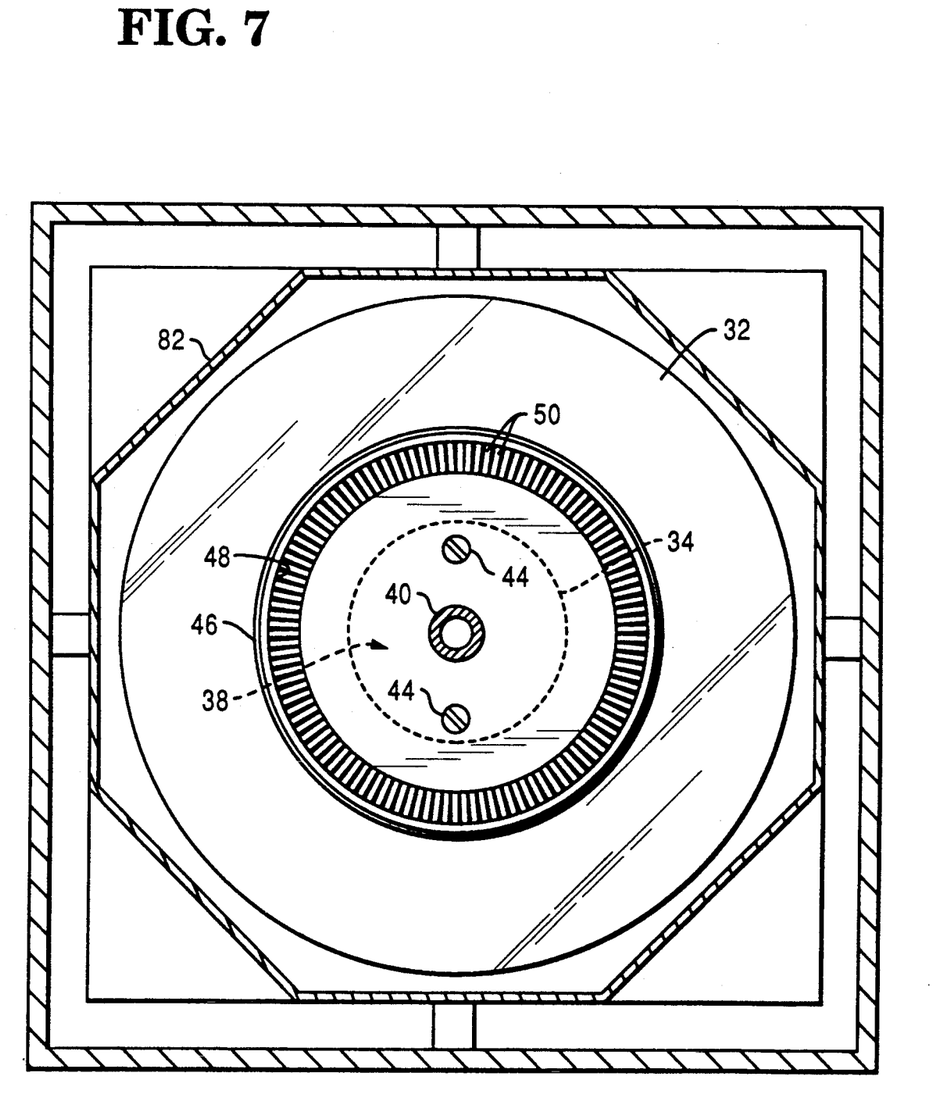
FIG. 7 is a view taken on lines 7—7 of FIG. 3 showing the base plate member and the location of the roller bearing members.
Figure 8:
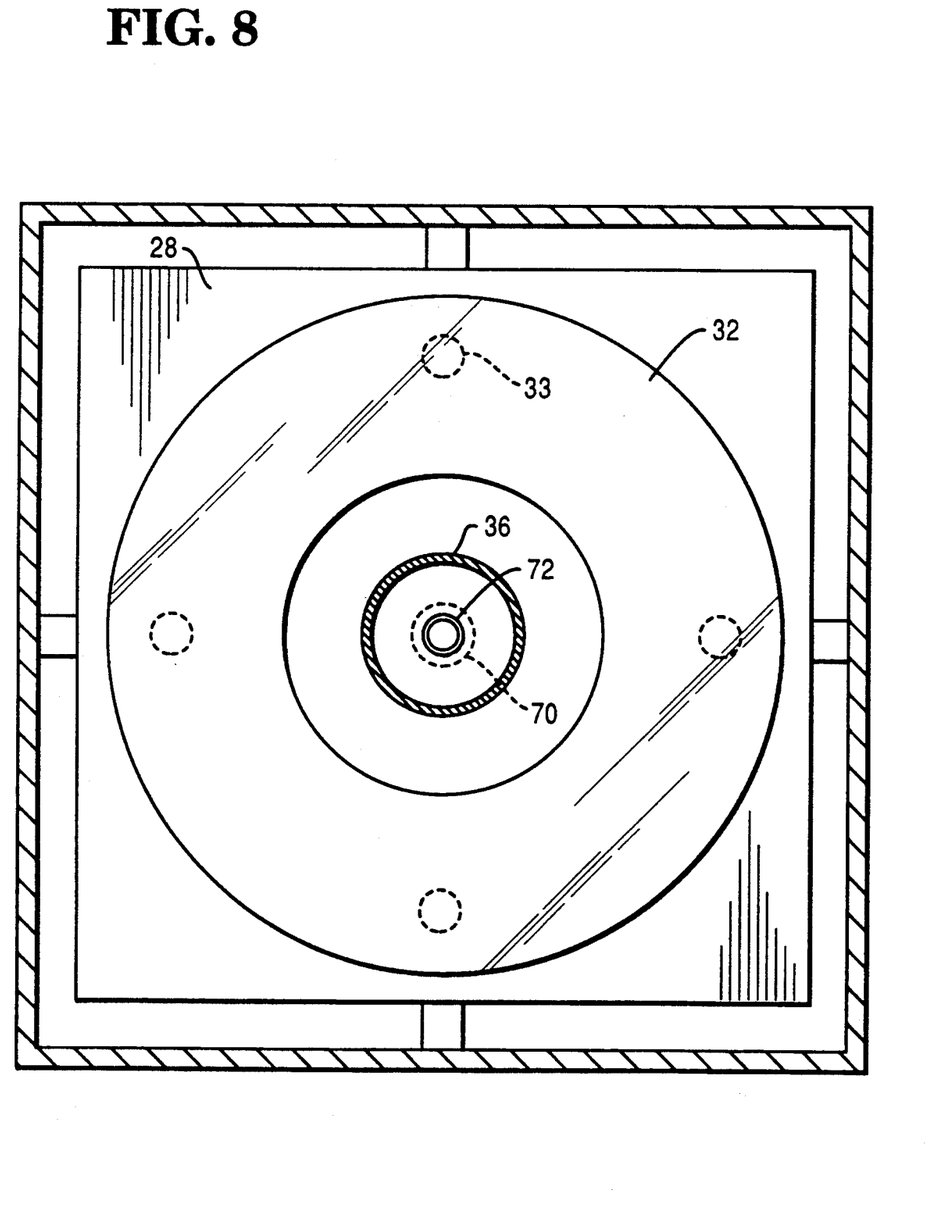
FIG. 8 is a view taken on lines 8—8 of FIG. 3 showing details of the ring shaped reflecting mirror.

The housing member 20 includes an aperture 22 located in the cover portion 23 of the housing member in which is mounted a transparent cover member 24 such as a glass window through which are projected the scanning light beams generated by the scanning apparatus of the present invention. As best seen from FIG. 3, mounted within the housing member 20 is an optical scanning apparatus generally indicated by the numeral 26 which includes a printed circuit board 28 mounted to the floor portion 30 of the enclosure 20 by means of studs 31. Mounted to the printed circuit board 28 by means of studs 33 (FIG. 3) is a ring shaped reflecting mirror member 32 (FIG. 8) which encircles a motor member 34 mounted on a hollow support member 36 secured to the printed circuit board 28. The motor member 34 (FIG. 7) rotates a hollow drive shaft 40 in a manner that is well known in the art.

Figure 6:
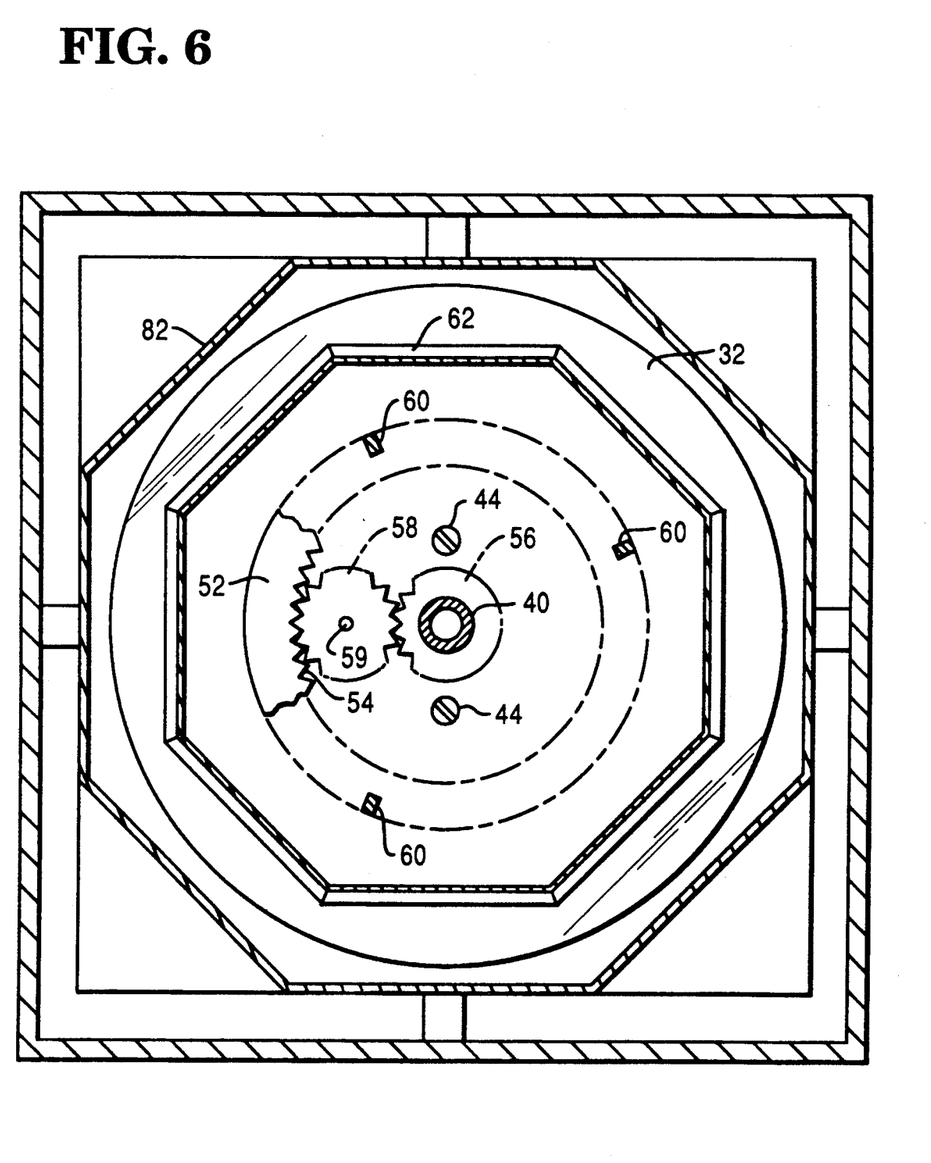
FIG. 6 is a cross-sectional view taken on line 6—6 of FIG. 3 showing details of the drive gear mechanism.

The drive shaft 40 is mounted on two bearing members 42 mounted within the motor member 34. Mounted to the motor member 34 by means of screws 44 (FIGS. 3 and 7) is a circular base plate member 46 (FIG. 7) which includes a circular slot 48 extending along the outer parameter of the plate member 46. Located in the slot 48 are a plurality of needle bearing members 50 which slidably support a ring member 52 (FIG. 6) having its inner circumferential surface comprised of gear teeth 54. Secured to the drive shaft 40 is a drive member 56 (FIGS. 3 and 6) which engages a second gear member 58 rotatably secured to the motor member 34 by means of a pin member 59 in the plate member 46, the gear member 58 engaging the gear teeth 54 of the ring member 52.

Figure 3:
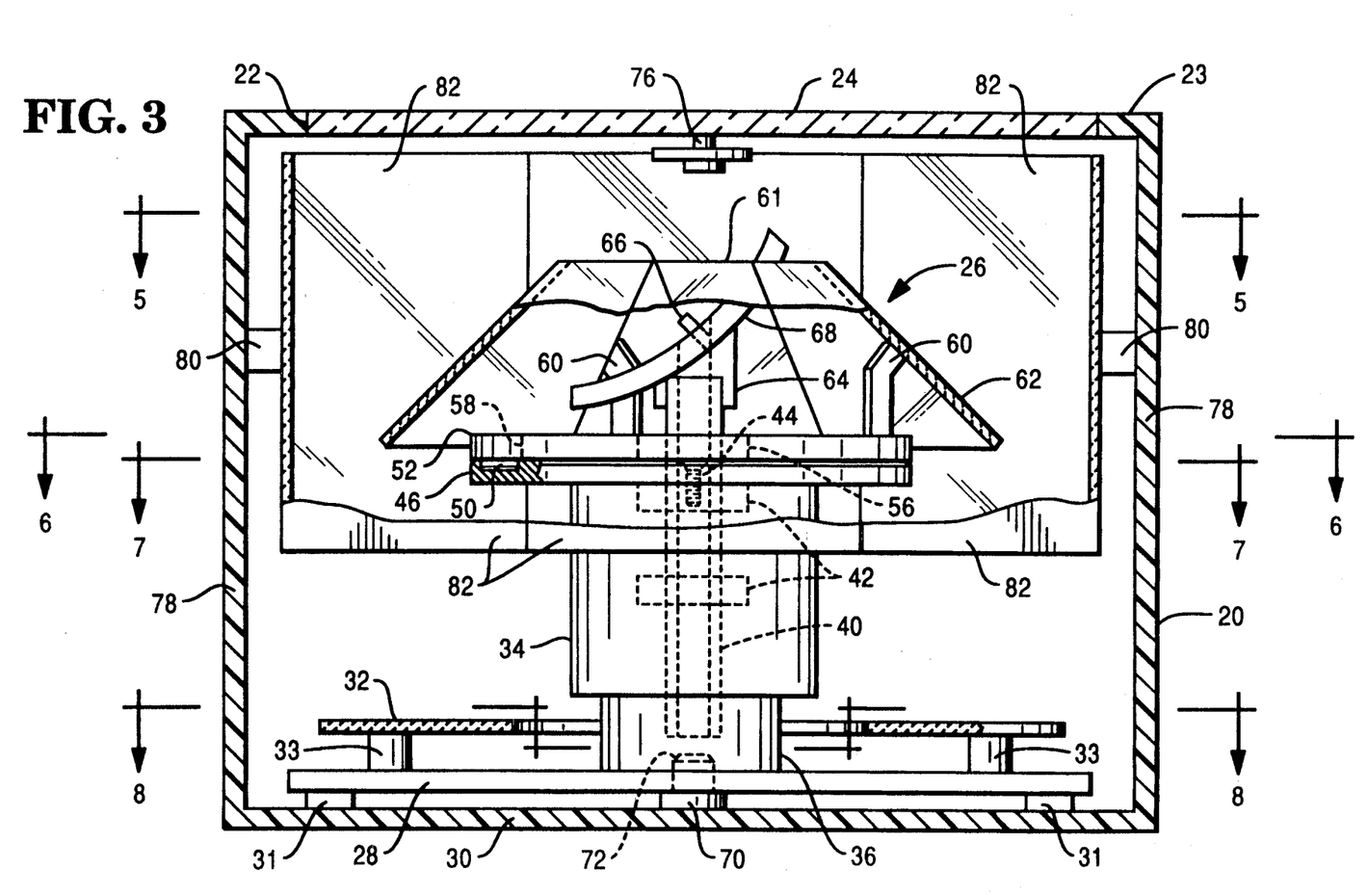
FIG. 3 is a cross-sectional view taken on line 3—3 of FIG. 1.

As best seen in FIG. 3, mounted on the ring member 50 are three arm members 60 which are attached to and support a conically shaped ring 61 of mirror members 62. Secured to the end of the drive shaft 40 is an optical transceiver 64 which includes a deflecting portion 66 and a collection portion 68. For a complete description of the optical transceiver 64 reference should be made to co-pending U.S. patent application docket Ser. No. 386,777, now U.S. Pat. No. 4,971,410 which is assigned to the assignee of the present application.

Figure 4:
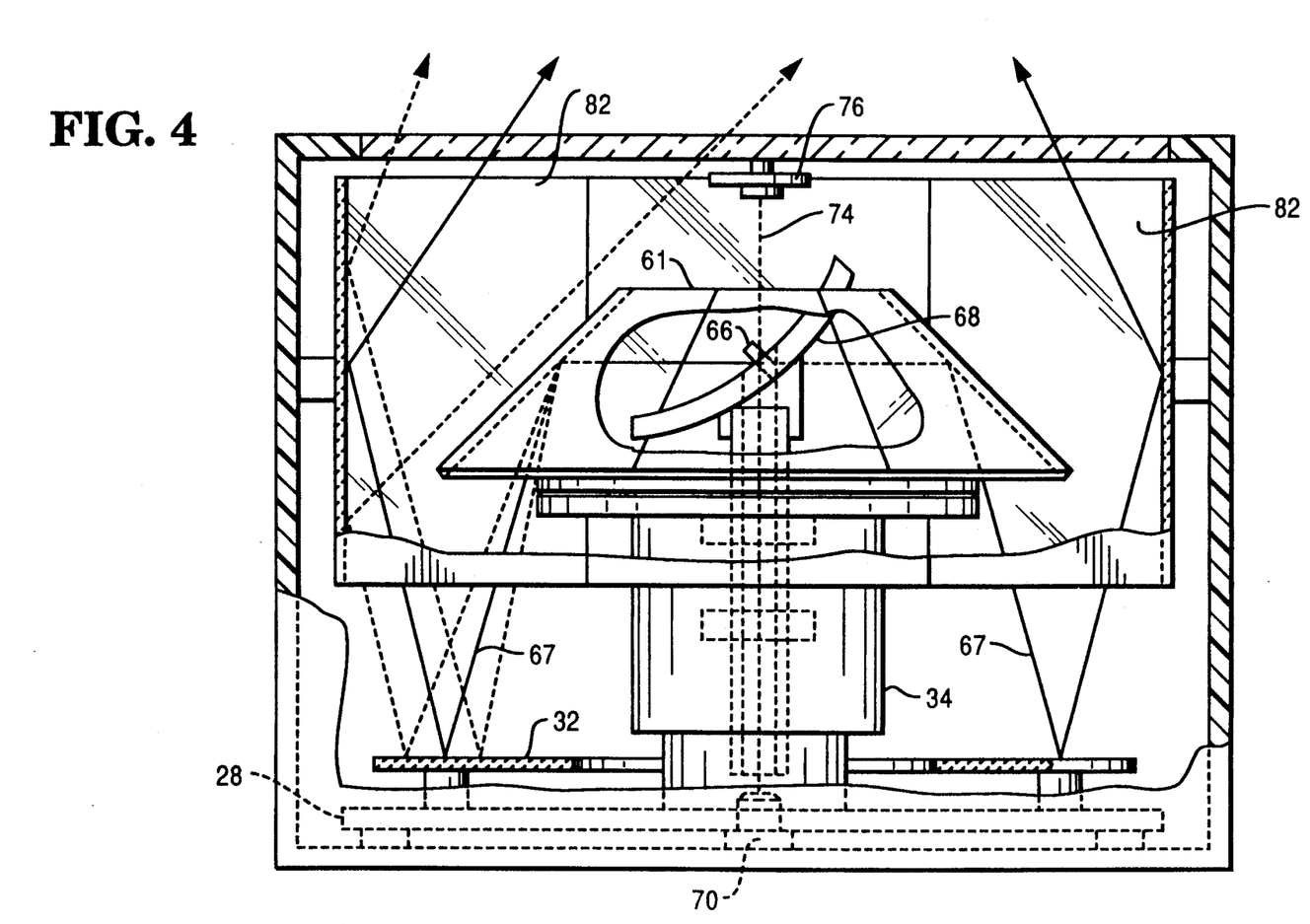
FIG. 4 is a cross-sectional view of the scanning apparatus similar to FIG. 3 showing the light paths of the scanning light beams.
Figure 5:
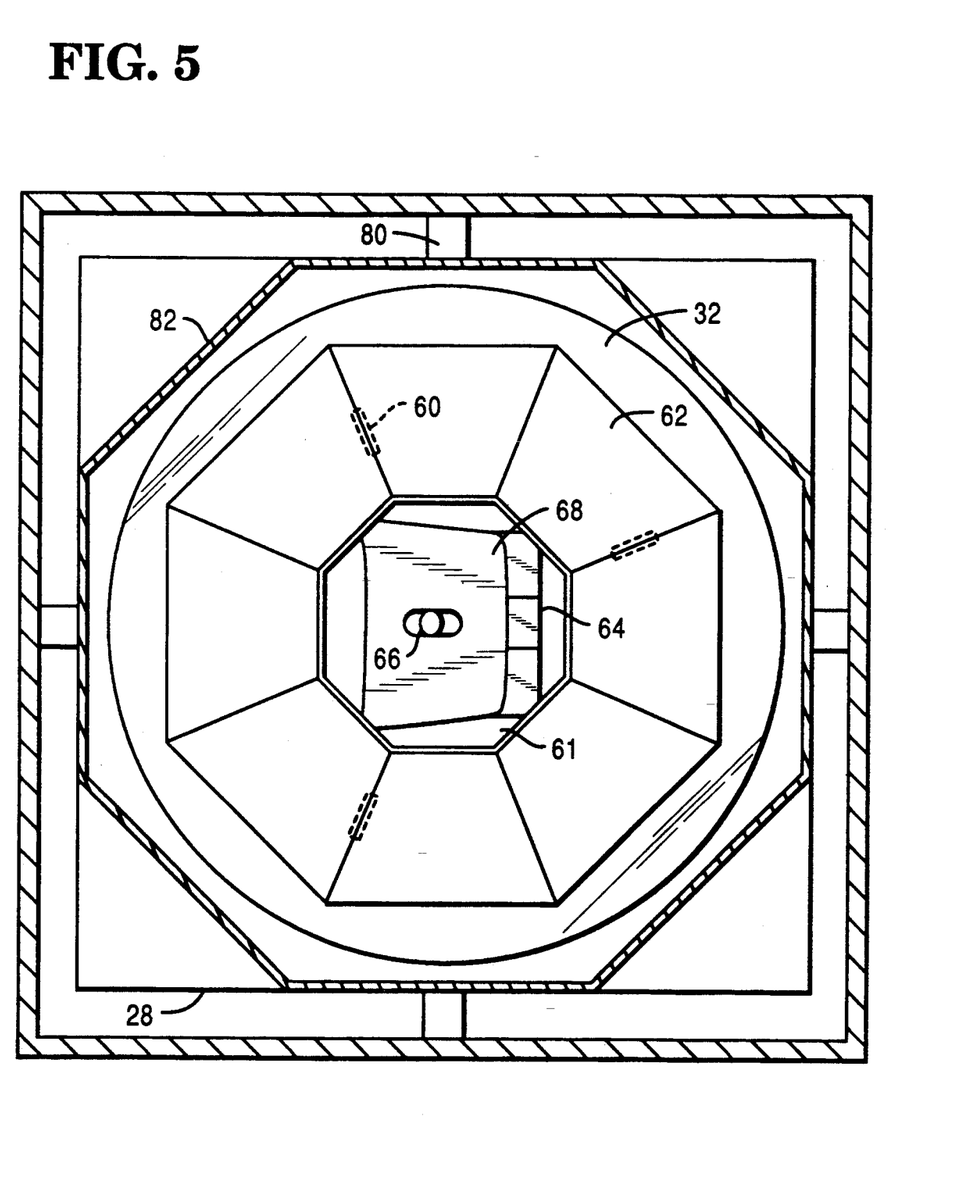
FIG. 5 is a cross-sectional view taken on line 5—5 of FIG. 3 showing a top view of the ring of mirrors.

Mounted on the printed circuit board 28 adjacent the open end of the drive shaft 40 is a laser diode member 70 and a collimating and focusing lens member 72 both of which are in alignment with the spin axis 74 (FIG. 4) of the drive shaft 40. The laser diode member 70 outputs a diverging light beam which is collimated and focused on a reference plane (not shown) in front of the glass window 24 by the lens member 72. Secured to the glass window 24 in any conventional manner such as an adhesive coating is a photodetector 76 which, as will be described more fully hereafter, receives the light beams reflected from a scanned bar code label for generating electrical signals in response to the intensity of the reflective light beams received.

Secured to the side wall portions 78 of the housing member 20 by means of studs 80 are eight vertically oriented pattern forming mirror members 82 (FIGS. 2-7 inclusive) which will deflect scanning light beams received from the mirror member 32 in a direction through the glass window 24 to form a scanning pattern 84 (FIG. 2) which is composed of a plurality of rectilinear scanning lines. The motor member 34 is a 5-volt brushless DC motor which rotates the drive shaft at a speed of approximately 3200 rpm.

In the operation of the scanning apparatus 26, the rotational movement of the drive shaft 40 will be transmitted through the gear members 56 and 58 to the ring member 52, rotating the ring member in a direction which is opposite to that of the rotation of the drive shaft 40. The laser diode member 70 will output a laser light beam through the drive shaft 40 which is deflected 90 degrees by the deflecting portion 66 of the optical transceiver 64. The light beams reflected by the deflecting portion 66 of the transceiver will strike the interior surface of the rotating mirror members 62, deflecting the light beams in a downward direction along a plurality of light paths 67 (FIG. 4) to strike the mirror member 32. The mirror member 32 deflects the light beams towards the pattern forming mirror members 82 which in turn deflect the received light beams through the glass window 24 in the aperture 22 in the form of the scan pattern 84 (FIG. 2) through which a bar code label is passed adjacent the glass window 24.

The light beams reflected from the scanned bar code label are transmitted through the glass window 24 along the light paths 66 which are collected by the collection portion 68 of the optical transceiver 64 for focusing the reflected light beams on the photodetector 76. It will also be seen from this arrangement that the reflected light beams are also directed towards the top opening 63 (FIG. 5) of the ring 61 of mirror members 62 to be collected by the collection portion 68 of the transceiver 64 which is mounted adjacent the top opening of the ring of mirrors.

Figure 2:
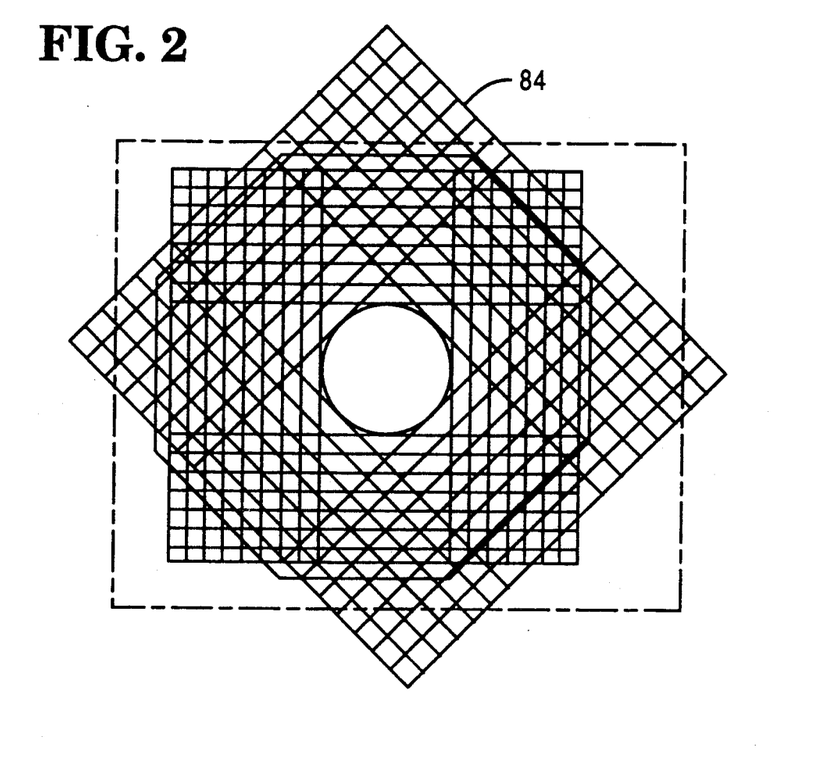
FIG. 2 is a schematic diagram of the optical scanning pattern generated by the preferred embodiment of the present invention.

The scan pattern 84 (FIG. 2) generated by the scanning apparatus of the present invention is the equivalent of 64 scan lines; 8 scan lines from 8 directions and from around 360 degrees assuming the use of eight pattern forming mirrors members 82 and eight mirror members 62 forming the ring 61. The exiting angles may vary between 40 and 90 degrees. The exiting scan lines in the scan pattern 84 from the top of the scanning apparatus are full length to give a large scan volume measured from the front of the scanning apparatus. A consideration of the present invention is that the 8/8 mirror arrangement will result in a plurality of partial scan lines as the full pattern effectively rotates around the drive shaft 40 as illustrated in FIG. 2. A wider scanning pattern is possible with different arrangement of the pattern mirror members 82 and the use of multiple bottom mirrors in place of the mirror member 32. While the present invention is shown disclosed in a portable housing member 20, it is obvious that the scanning apparatus can be mounted within a checkout counter as is normal in such checkout installations.

Although the preferred embodiment of the present invention has been described herein, it is not intended that the invention be restricted thereto but that it be limited only by the true spirit and scope of the appended claims.

What is claimed is:

1. An optical scanning apparatus comprising:
   a rotatably mounted drive member rotating in a first direction;
   a source of scanning light beams projecting the light beams along a first light path;
   a first deflecting means mounted on said drive member and in said first light path for deflecting the light beams along a plurality of second light paths;
   first drive means for rotating the drive member in said first direction;
   a ring of first mirror members conically arranged around said first deflecting means whereby the light beams deflected by said first deflecting means will strike the interior surfaces of said first mirror members for deflecting the beams along a plurality of third light paths which extend in a direction opposite to said first light path;

second drive means for rotating the first mirror members in a second direction opposite to said first direction;

a horizontally extending circular mirror member fixedly mounted below said ring of first mirror members and which extends beneath the entire ring of first mirror members and surrounds the drive member for deflecting the light beams along a plurality of fourth light paths; and a ring of second mirror members mounted around said ring of first mirror members and in said fourth light paths for receiving the light beams deflected by said circular mirror member for deflecting the light beams in said scanning direction.

2. The scanning apparatus of claim 1 in which said circular mirror member comprises a ring shaped mirror.

3. The scanning apparatus of claim 1 in which said first deflecting means comprises a third mirror member mounted offset to said first light path for deflecting the light beams along said plurality of second light paths.

4. An optical scanning apparatus for scanning bar code symbols on objects passing adjacent the scanning apparatus comprising;

a drive member mounted for rotation on an axis of rotation in a first direction;

a source of scanning light beams for projecting the scanning light beams along the axis of rotation;

means mounted on the drive member for deflecting the light beams along a plurality of first light paths which are offset to said axis of rotation, said deflecting means being rotated by said drive member in said first direction;

first mirror means mounted for rotation about said axis of rotation adjacent said deflecting means, said mirror means positioned in said first light paths;

drive means connected to said first mirror means and said drive member for rotating said first mirror means in a second direction which is opposite to said first direction enabling the first mirror means to deflect the light beams along a plurality of second light paths which are in the opposite direction of said first light paths;

a horizontally extending circular mirror fixedly mounted below said first mirror means and in said second light paths, said circular mirror member extending entirely beneath said first mirror means and surrounding said drive member for deflecting the light beams along a plurality of third light paths; and second mirror means mounted around said circular mirror member in said third light paths for deflecting the light beams in the form of a raster scan pattern in a scanning direction.

5. The scanning apparatus of claim 4 in which the second mirror means is mounted in a direction perpendicular to said first mirror member.

6. The scanning apparatus of claim 4 in which the first mirror means comprises a ring of first mirror members conically orientated around said deflecting means whereby the light beams deflected by the deflecting means will strike the interior surfaces of the first mirror members which deflect the light beams in a downward direction along said second paths towards the circular mirror member.

7. The scanning apparatus of claim 6 in which said drive means comprises gear members engaging said drive member and said first mirror means for rotating said mirror means in a direction opposite to the direction of rotation of said drive member.

8. The scanning apparatus of claim 6 in which said first mirror means includes a first support member having a bearing surface, a second support member mounted on said bearing surface and engaged by said drive means for rotational movement on said bearing surface and a plurality of third support members secured to said second support member for supporting said ring of second mirror members for movement in a direction opposite to the rotational movement of the drive member.

9. The scanning apparatus of claim 4 in which said circular mirror member comprises a ring mirror.

10. The scanning apparatus of claim 4 in which said drive means includes motor means for rotating said drive member, said apparatus further including a printed circuit board on which is mounted the source of scanning light beams and said motor means.

11. An optical scanning apparatus for scanning bar code symbols on objects passing over the scanning apparatus including a housing structure which includes a source of scanning light beams for projecting the light beams along a first light path comprising;

rotating drive means mounted adjacent said source including a hollow rotating drive member having one end positioned adjacent the source of scanning light beams for receiving the scanning light beams projected along said first light path;

deflecting means mounted on the opposite end of said drive member and located in said first light path for deflecting the light beams along a plurality of second light paths;

a support assembly mounted on said drive means;

a ring of mirrors rotatably mounted on said support assembly and in said plurality of second light paths for deflecting the light beams along a plurality of third light paths;

first gear means secured to said drive member;

a plurality of second gear means mounted on said drive means and engaging said first gear means and said ring of mirrors for rotating said ring of mirrors in a direction opposite to the direction of the drive shaft;

a first deflecting mirror mounted below the ring of mirrors in said plurality of third light paths and adjacent the source of scanning light beams for deflecting the light beams along a plurality of fourth light paths;

a plurality of second deflecting mirrors mounted adjacent the ring of mirrors and in said fourth light paths and extending in a direction generally perpendicular to the first deflecting mirror for forming a scanning pattern for scanning bar code symbols;

collection means mounted on said drive shaft adjacent the interior of said ring of mirrors for collecting the light beams reflected from the scanned bar code symbols and directing the light beams at a location; and detector means mounted on the axis of rotation of said drive means and at said location for receiving the light reflected from the bar code symbols for generating electrical signals representing the data scanned by the optical scanning apparatus.

12. The scanning apparatus of claim 11 in which the ring of mirrors is conically orientated around said deflecting means whereby the light beams deflected by the deflecting means will strike the interior surfaces of the ring of mirrors which deflect the light beams in a downward direction towards the first deflecting mirror.

13. The scanning apparatus of claim 12 in which said support assembly includes a first support member having a bearing surface, a second support member mounted on said bearing surface and engaged by said drive means for rotational movement on said bearing surface and a plurality of third support members secured to said second support member for supporting said ring of mirrors for movement in a direction opposite to the rotational movement of the drive member.

14. The scanning apparatus of claim 13 in which said first deflecting means comprises a circular mirror surrounding said drive means.

15. The scanning apparatus of claim 13 further including a plurality of bearing members mounted on said bearing surface and rotatably supporting said second support member.

16. The scanning apparatus of claim 13 in which said third support members comprise arm members extending outwardly from said second support member and secured to said ring of mirrors for supporting said ring of mirrors for movement around said deflecting means.

17. The scanning apparatus of claim 11 in which said drive means includes a motor member engaging said hollow drive member for rotating the drive member when operated, said scanning apparatus further including a printed circuit board on which is mounted the source of scanning light beams and said motor member.

18. An optical scanning apparatus comprising:
a rotatably mounted drive member rotating in the first direction;
a source of scanning light beams projecting the light beams along a first light path;
a first deflecting means mounted on said drive member and in said first light path for deflecting the light beams along a plurality of second light paths;
first drive means for rotating the drive member in said first direction;
a ring of first mirror members rotatably mounted in said second light paths for deflecting the light beams along a plurality of third light paths, said ring of first mirror members being conically arranged around said first deflecting means whereby the light beams deflected by said first deflecting means will strike the interior surface of said first mirror members which deflect the light beams along said third light paths;
second drive means for rotating the second deflecting means in a second direction opposite to said first direction;
a second mirror member mounted below said ring of first mirror members and in said third light paths for deflecting the light beams in a plurality of fourth light paths; and
a ring of third mirror members mounted around said ring of first mirror members and in said fourth light paths for receiving the light beams directed by said second mirror member, said third mirror members deflecting the light beams in a scanning direction in the form of a scan pattern for scanning coded indicia located in said scanning direction.

19. An optical scanning apparatus for scanning bar code symbols on objects passing adjacent the scanning apparatus comprising;
a drive member mounted for rotation on an axis of rotation in a first direction;
a source of scanning light beams for projecting the scanning light beams along the axis of rotation;
means mounted on the drive member for deflecting the light beams along a plurality of first light paths offset to said axis of rotation, said means being rotated by said drive member in said first direction;
first mirror means mounted for rotation about said axis of rotation adjacent said deflecting means, said mirror means positioned in said first light paths;
drive means connected to said mirror means and said drive member for rotating said first mirror means in a second direction which is opposite to said first direction enabling said first mirror means to deflect the light beams along a plurality of second light paths;
a first mirror member mounted below said first mirror means and in said second light paths for deflecting the light beams along a plurality of third light paths; and
second mirror means mounted adjacent said first mirror member and in said third light paths for deflecting the light beams in the form of raster scan pattern in a scanning direction.

20. The scanning apparatus of claim 19 in which the second mirror means is mounted in a direction perpendicular to said first mirror member.

21. The scanning apparatus of claim 19 in which the first mirror member comprises a ring mirror.

* * * * *